June 10, 1924.
E. L. PETERSON
CONCRETE CONDUIT SYSTEM
Filed Aug. 10, 1920   5 Sheets-Sheet 1
1,497,583
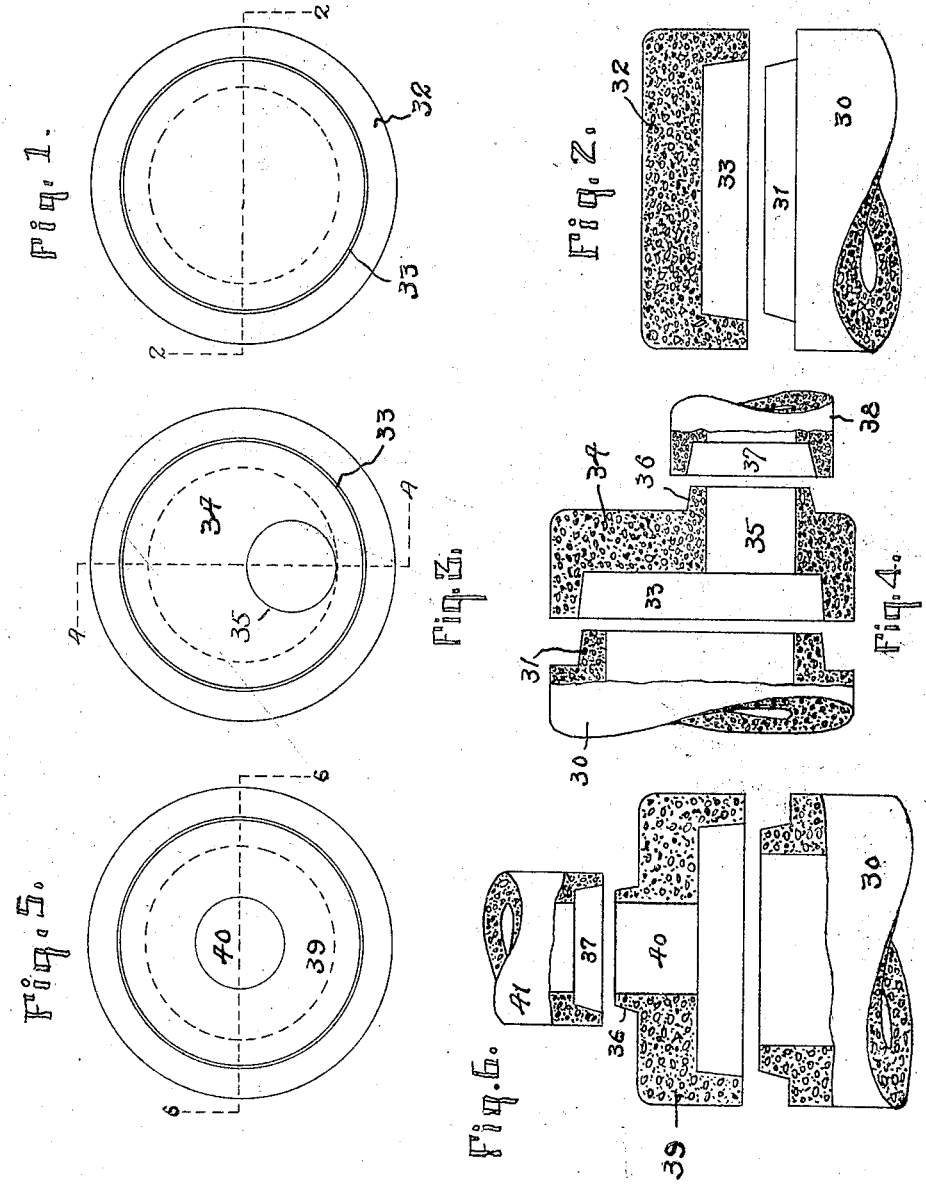
INVENTOR
Carl L. Peterson.
BY
*Howson and Howson*
ATTORNEYS

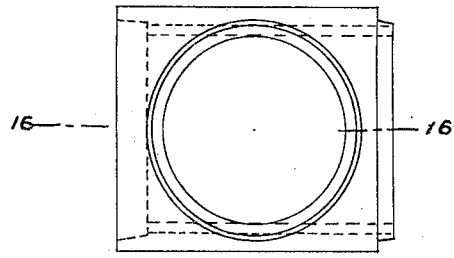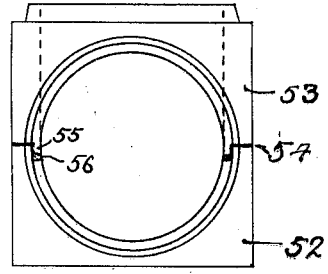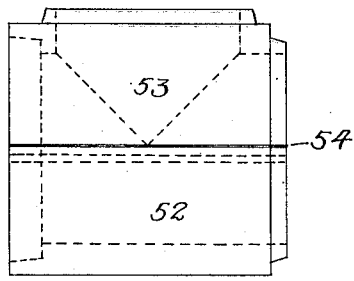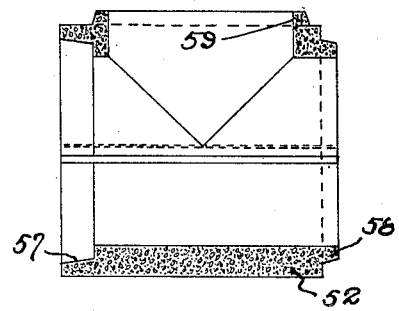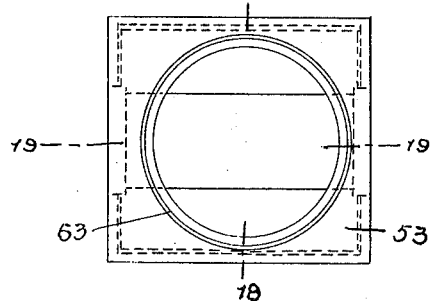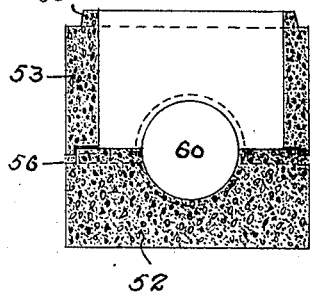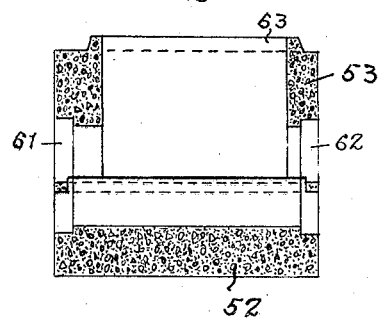

June 10, 1924.
E. L. PETERSON
1,497,583
CONCRETE CONDUIT SYSTEM
Filed Aug. 10, 1920    5 Sheets-Sheet 5
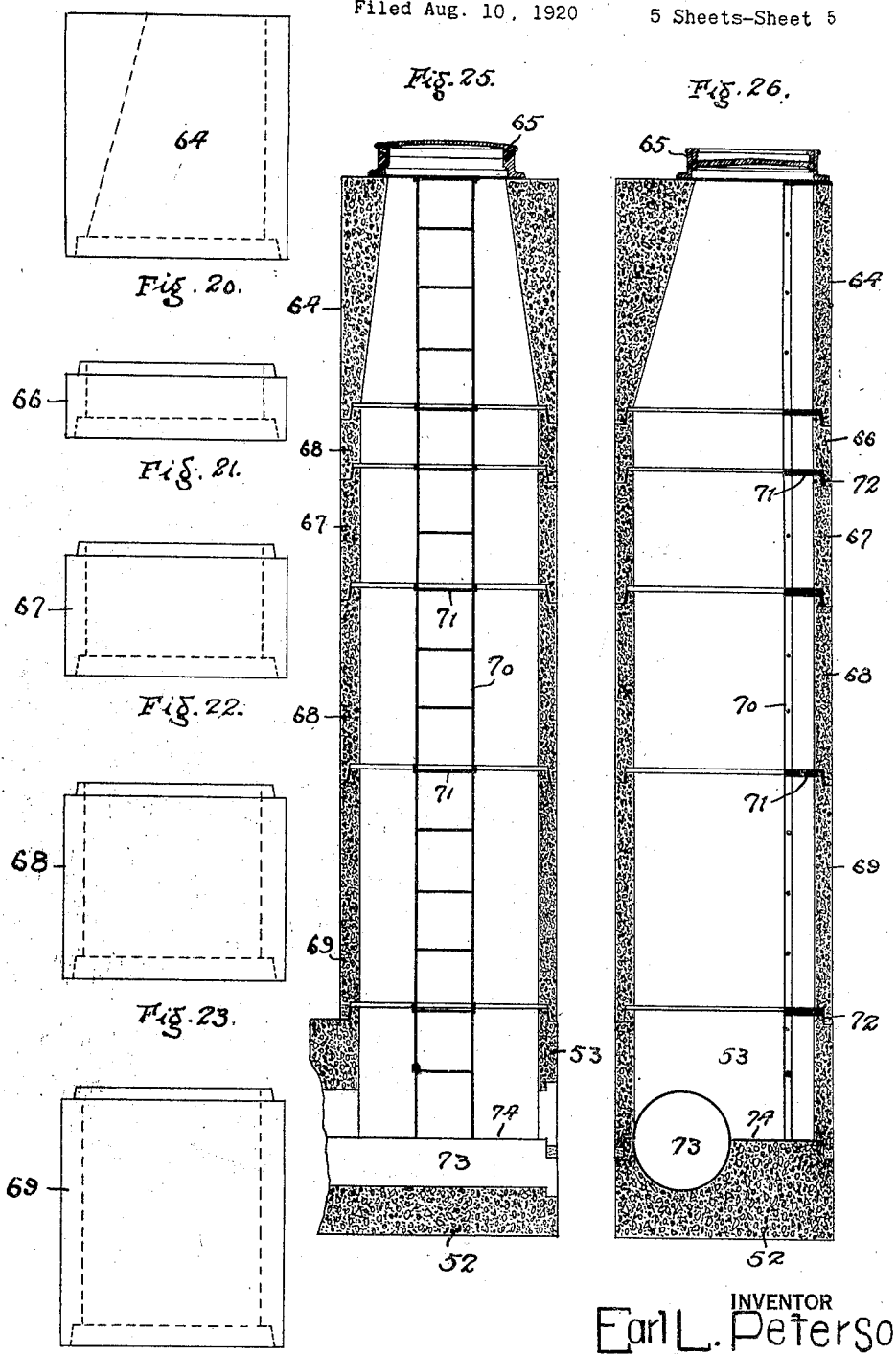

Patented June 10, 1924.

1,497,583

UNITED STATES PATENT OFFICE.

EARL L. PETERSON, OF CORONA, NEW YORK, ASSIGNOR TO UNITED CONCRETE PIPE COMPANY, OF NEW YORK, N. Y., A CORPORATION OF DELAWARE.

CONCRETE CONDUIT SYSTEM.

Application filed August 10, 1920. Serial No. 402,641.

*To all whom it may concern:*

Be it known that I, EARL L. PETERSON, a citizen of the United States of America, residing at Corona, in the county of Queens, Long Island, and State of New York, have invented certain new and useful Improvements in Concrete Conduit Systems, of which the following is a specification.

My invention relates to concrete conduit systems, and the object of my invention is to provide for such a system a unit type of construction adaptable to various installation conditions and requirements, and by the use of which the necessity for building forms and casting in situ such elements as manholes, ells, tees, crosses, plugs, reducers, cones, etc., is eliminated.

In the accompanying drawings—

Fig. 1 is an end elevation of a closure cap adapted to fit the spigot end of a pipe section;

Fig. 2 is a broken elevation of a pipe end showing the cap in section (on the line 2—2, Fig. 1) and in position to be fitted upon the pipe end;

Fig. 3 is an end elevation of a reducing cap having a port adapted for connection to a conduit of reduced diameter;

Fig. 4 is a broken elevation showing this cap and associated ends of large and small diameter pipes dis-assembled, the port in the cap being so located as to maintain the flow line for the large and small conduits on the same level. The section of the cap is on the line 4—4, Fig. 3;

Figs. 5 and 6 are similar views, showing a modified construction in which the reducing port is arranged co-axially with the pipe main. The cap is shown in section on the line 6—6, Fig. 5;

Fig. 13 is a plan of a modified construction of the unit section in which the upper and lower portions thereof are independent;

Figs. 14 and 15 are side elevations thereof at right angles to each other;

Fig. 16 is a vertical section on the line 16—16, Fig. 13;

Fig. 17 is a plan view of a T-unit having a small diameter flow line, the unit being formed in two pieces, as the construction shown in Figs. 13 to 16;

Fig. 18 is a section on the line 18—18, Fig. 17;

Fig. 19 is a section on the line 19—19, Fig. 17;

Figs. 20, 21, 22, 23, 24 are side elevations of section units for a manhole;

Figs. 25 and 26 are views at right angles to each other through a manhole composed of the sections shown in Figs. 20 to 24 inclusive, and combined with a two-piece T-unit for a small diameter flow line.

Figure 7:
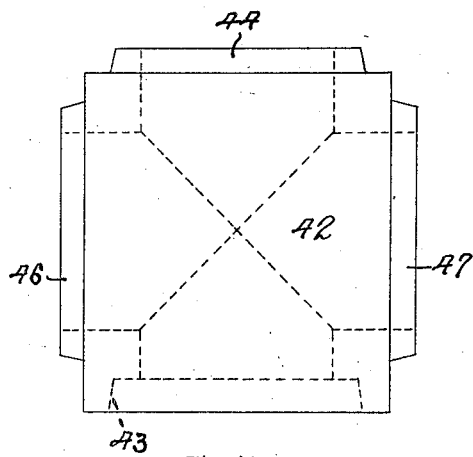
Fig. 7 is a plan view of a cross connection unit adapted to be connected to a pipe length, and having ports and associated joint means for connection with cross lines and a continuation line.
Figure 8:
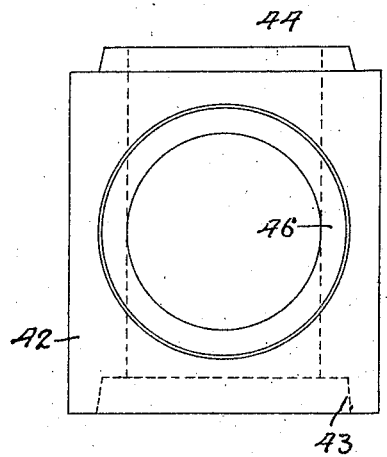
Figs. 8 and 9 are side elevations thereof at right angles to each other.
Figure 9:
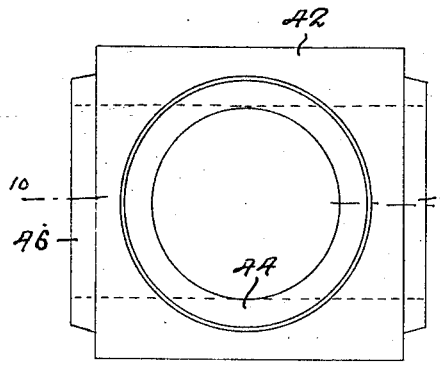
Figure 10:
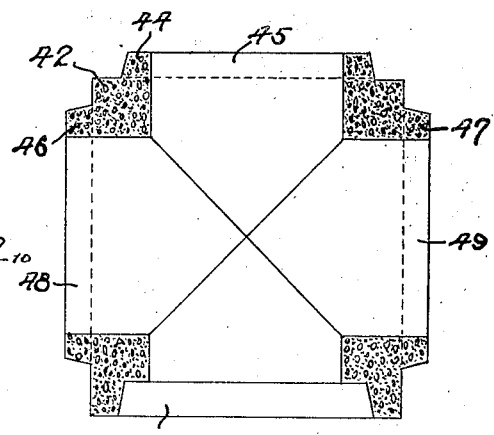
Fig. 10 is a section on the line 10—10, Fig. 9.

It has heretofore been customary in building concrete conduit lines, to form the cross connections, manholes, etc., by building, in situ, suitable forms and pouring the concrete therein. This has been the practice whether the conduit is formed by casting it throughout in situ, or by laying preformed pipe lengths in a trench. The delays in effecting the installation and the expense incident to this practice seriously interrupt the progress of the work, and constitute an important item of expense. To relieve this situation, I have devised a unit system of construction which is adapted to practically all types of branch connections, and by the use of which the installation may proceed without interruption for form building, and the work may be accomplished at much less expense.

Referring to Figs. 1 and 2, I have indicated at 30 a pipe section having a spigot end 31, adapted to form joint with the usual bell end of an adjacent pipe section. As an element of my present unit system, I provide a plug cap, 32 of concrete, having a bell end 33 adapted to fit and make joint with the spigot 31, and thus form an end closure for the pipe section 30. To seal the latter it is merely necessary to apply the cap to the spigot end, as indicated in Fig. 2, the joint between the pipe section and cap being formed in precisely the same manner as the joint between two co-operating pipe ends.

In Figs. 3 and 4 I have shown a modified form of cap 34, which is similarly provided with a bell joint 33 to co-operate with the spigot end 31 of the pipe 30. The cap in this modification, however, is provided with a port 35 arranged on the flow line of the pipe 30, and having on the opposite face of the cap a spigot 36 adapted to enter and make joint with the bell end 37 of a pipe 38 of reduced diameter. The flow therethrough, to or from the main 30, is obviously of less volume than the capacity of the main 30. Such a construction is well adapted for a sewer pipe installation in which the pipe 38, of reduced diameter, forms a feeder to the sewer main 30. It is well adapted, also, to a flow from the main to the branch 38, where the main is not filled to capacity.

In Figs. 5 and 6 the cap 39 has its branch port 40 of reduced diameter arranged co-axially with the main 30, and feeds to or from the branch pipe 41, the bell end 37 of which makes joint with the spigot 36 on the cap 39. An arrangement of this type may be used where the flow through the main 30 is under pressure and there is no necessity for keeping the flow lines of the branch and main conduits on the same level. The trench for the branch line 41 may be of less depth, obviously, than is required in a construction of the type shown in Figs. 3 and 4.

In Figs. 7 to 10, inclusive, I have shown a pre-formed branch unit 42 affording a cross connection to branch lines at right angles to the main, as well as a connection for a continuation of the main. As clearly shown in Fig. 10, the unit has a bell 43, for connection to the main, a spigot 44 at the opposite side surrounding the port 45, which opens to a continuation of the main; while at right angles thereto are spigots 46 and 47 surrounding the ports 48 and 49, by which connection is made to the bell ends of the branch lines extending at right angles to the main. A unit of this construction affords various possible branch connections, two of which are shown in Figs. 11 and 12.

Figure 11:
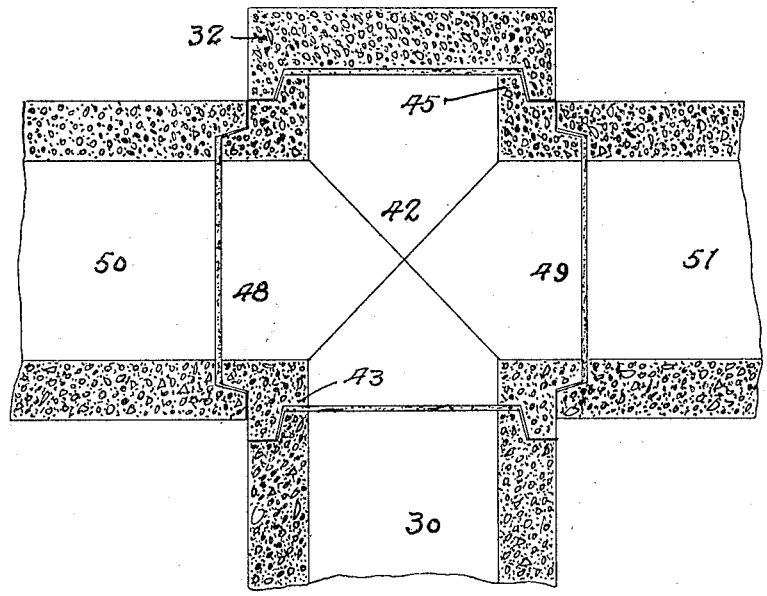
Fig. 11 is a longitudinal section through the T-installation, employing a unit of the type shown in Figs. 7 to 10 inclusive.

As indicated in Fig. 11, the main is not continued, but a cap 32, such as is shown in Figs. 1 and 2, is fitted upon the spigot 44 to close the port 45, while the branch pipes 50 and 51 form a T connection, opening through ports 48 and 49 in the connection unit.

Figure 12:
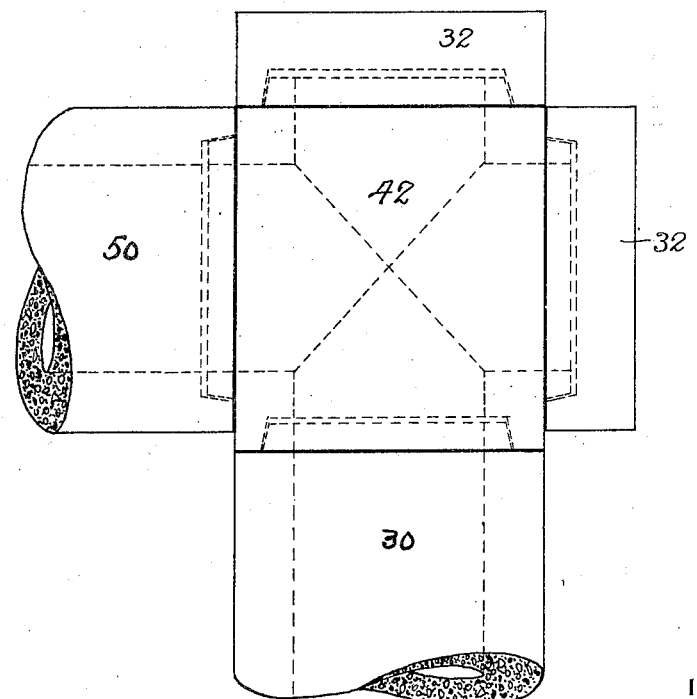
Fig. 12 is a plan showing an L installation in which the same unit is employed.

In Fig. 12 the installation is varied by omitting the right-hand connection 51 and closing the port 49 with a second cap 32, the connection thus forming an L.

In a branch connection unit of the type described, the exterior is generally cubical in form, while the port contours are rounded to follow the outline of the pipes or caps. The units are of a size and type well adapted to usual trench installation practices, with the slight modification that at the juncture of the main and branch line trenches a flat platform is provided upon which the connection unit rests. The interior of the joint areas between the units and the pipe lengths are of course filled with grouting or neat cement to afford a smooth flow surface, as indicated in Fig. 11, just as in a joint between abutting pipe lengths.

In the modification shown in Figs. 13 to 19, inclusive, the construction comprises a flat base 52, independent of the upper portion 53 of the connection unit. This division of the unit into upper and lower sections is merely a convenience in the manufacture thereof. It is of considerable practical value, however, when the line is one of large diameter, since a one piece block is often too bulky and heavy to conveniently install. Where the diameter of the pipe is greater than the diameter of the manhole, it is nevertheless a convenience to form the top opening of a size uniform with that of the pipe (as in Figs. 13–16), since the same mold forms may be used. A reducing cap of the type shown in Figs. 3 to 6 is then fitted on the top opening, and the manhole casing built up around the reduced port in the cap.

The precise nature of the joint between the upper and lower sections 52 and 53 may be of any desired type, but I have found a lap joint satisfactory, and have indicated such a connection between the parts at 54. The flange 55 is preferably of somewhat less depth than the shoulder on the lower section 52, so that a space 56 is afforded for trowelling in grout or neat cement to seal the joint and afford a smooth flow surface through the unit.

As here shown, the two part unit has at one end a bell flange 57 to receive the spigot of the in-coming main, while at its opposite end is a spigot 58 for making joint with the adjacent pipe section which continues the main. A port, with spigot flange 59, opens through the top of the upper section for connection to the reducing cap, vertical pipe, or unit section (hereinafter described) which may be used to form the body of the manhole casing. It will be noted that the bell end of pipe fitting on the spigot 58 of the connection unit serves as a tie ring, which assists in holding the upper and lower portions 52 and 53 in position. Where a cross connection unit, such as indicated in Figs. 7–10, is made in two parts, the bell ends of the branch lines or caps, will reinforce the spigot end of the connection unit to the same end. On a pressure line, this is of considerable value. The two prior constructions of the unit are of especial value under these conditions, since the shape of the lower section adjacent the flow line is such that the unit could not be cast in one piece with certainty of a complete fill of the mold form at the flow line.

In Figs. 17, 18 and 19, I have shown the same type of construction, but having a manhole opening of greater diameter than that of the pipe line. The port opening to the latter is indicated at 60, and connection from the main to the unit is effected by the bell joints 61 and 62, into which the cooperating ends of the connecting pipe line sections or joint straps are introduced. It is, of course, possible to substitute for one of the bell joints, a spigot flange to take into the bell of a connecting line section. In any case, the joint at the manhole is preferably by a spigot flange 63, as indicated. In the modification indicated in these figures, the lap joint between the unit sections is exterior, and the joint opening 56 is preferably filled with grout, as above indicated.

The manhole casing is shown in Figs. 20 to 26, and preferably comprises a top section 64, especially shaped to co-operate with the metal cover 65 commonly used at the ground level. A series of pre-formed unit sections 66, 67, 68 and 69, of different lengths, but of the same diameter, afford means for building up the manhole casing to any desired height, as many units as necessary being used to bring the manhole cover 65 to ground level. The unit sections 64 to 69 are all interconnected by bell and spigot joints in the same fashion as pipe lengths. The vertical ladder 70 may be supported within the manhole by means of brackets 71, having offset ends 72 adapted to be hooked over the spigot flanges at the joint between adjacent sections, and be clamped in position by the weight of the superimposed sections of the casing.

In Figs. 25 and 26, the flow line 73, which is formed in a two piece branch unit 52—53, is arranged to one side of the center of the latter, so as to afford a working platform 74, upon which the foot of the ladder rests.

While the unit construction which I have indicated is simple and workable, and greatly facilitates the progress, as well as lessening the cost, of a pipe line installation, it will be readily recognized that the particular form of the units may be variously modified while still retaining the advantages of this practice, without departure from what I claim as the underlying features of my invention embodied in the illustrative example shown and described.

I claim—

1. In a concrete conduit system, unit pipe lengths, and unit branch connection blocks having joint elements for making connection with associated main and branch line pipe lengths, said joint elements comprising peripheral joint faces of such extent as to afford a sealing space between adjacent portions of the joint-forming members to receive a grout seal.

2. In a concrete conduit system, unit pipe lengths, and unit branch connection blocks of generally rectangular shape having lateral curvilinear joint elements for making connection with associated main and branch line pipe lengths of different diameter.

3. In a concrete conduit system, unit pipe lengths, and unit branch connection blocks of generally rectangular shape, with lateral port openings at right angles to each other, said port openings having curvilinear joint elements of the same type as those of the unit pipe lengths to afford a standard type of construction throughout the system.

4. In a concrete conduit system, unit pipe lengths, a generally rectangular unit connection block having lateral port openings and associated curvilinear joint elements for making connection with associated unit pipe lengths, said connection block having a top port with similar joint elements for connection with a unit section forming portion of the wall of the manhole well.

5. In a concrete conduit system, a connection block having lateral ports adapted for connection to main or branch line pipe lengths, and a top manhole port, in combination with unit blocks adapted to make joint with said connection block at the manhole port and form the manhole casing above the same.

6. In a concrete conduit system, unit pipe lengths, and a unit connection block having a top port adapted to open to a manhole well, the manhole port being of greater diameter than the ports for connection to the pipe lengths.

7. In a concrete conduit system, unit pipe lengths, and a unit connection block having a top port adapted to open to a manhole well, the axis of the pipe connection ports lying to one side of the axis of the manhole port.

8. In a concrete conduit system, a connection block having lateral ports for connection to the pipe line, a top manhole port, and an interior working platform beneath the manhole port and to one side of the flow line through the connection block.

9. In a concrete conduit system, a connection block of generally cubical outline, having curvilinear ports for pipe line connections, and joint elements of the type for effecting a grout seal bell and spigot joint, in combination with a cap adapted to fit upon a port and at least partially close the latter.

10. In a concrete conduit system, a generally rectilinear connection block comprising lap jointed bottom and top sections recessed on adjacent faces to form lateral ports, having cooperating curvilinear joint elements for connection to associated unit pipe lengths, said top section having a manhole opening therein, and joint elements at the manhole adapted to make joint with a unit block forming portion of the manhole casing resting on said connection block.

In testimony whereof I have signed my name to this specification.

EARL L. PETERSON.